June 2, 1925.
G. P. HENRY
SPEEDOMETER DRIVING MECHANISM
Filed April 29, 1922
1,540,395
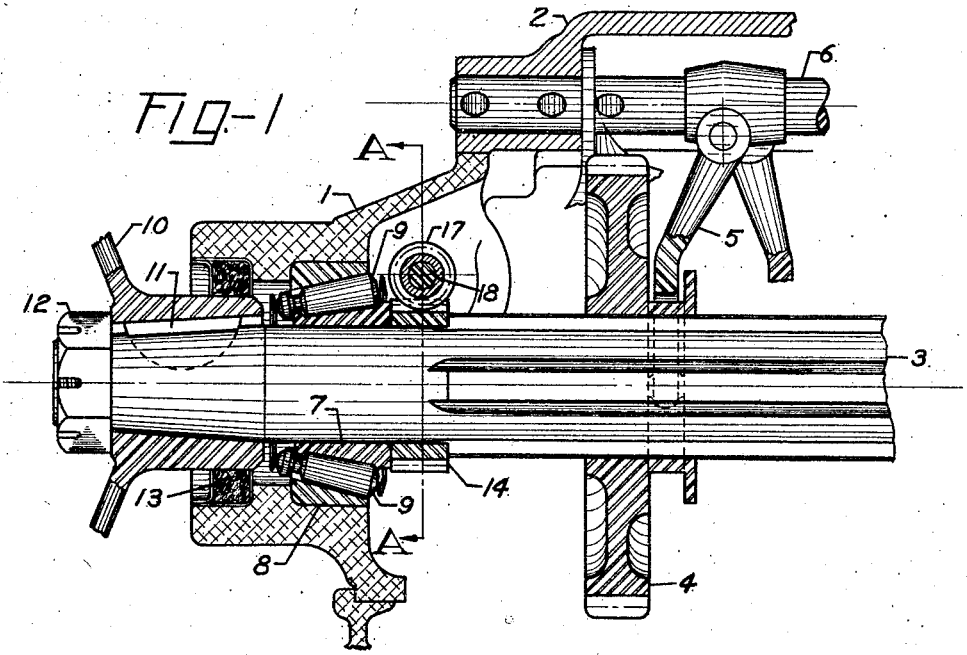
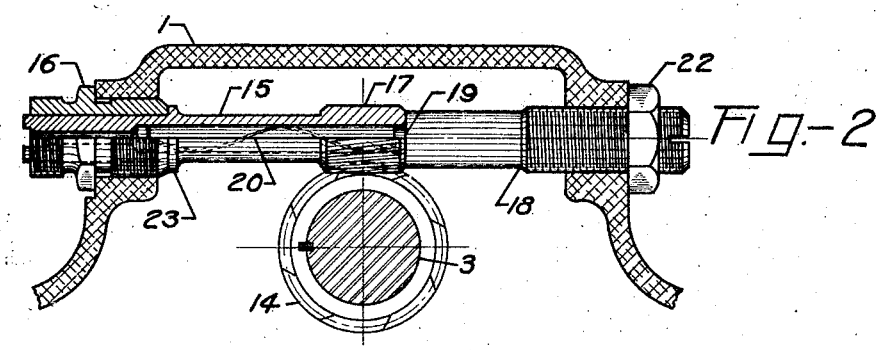
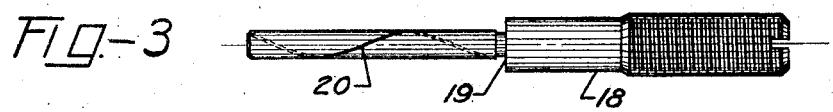
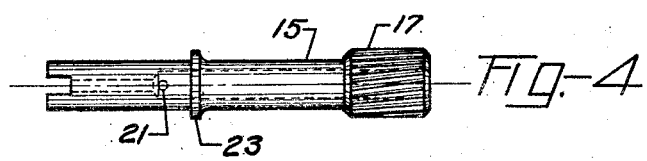
INVENTOR
GUY P. HENRY
BY
William MacGlashan
ATTORNEY Patented June 2, 1925.

1,540,395

UNITED STATES PATENT OFFICE.

GUY P. HENRY, OF DETROIT, MICHIGAN, ASSIGNOR TO STUDEBAKER CORPORATION, A CORPORATION OF NEW JERSEY.

SPEEDOMETER-DRIVING MECHANISM.

Application filed April 29, 1922. Serial No. 557,278.

*To all whom it may concern:*

Be it known that I, GUY P. HENRY, a citizen of the United States of America, and resident of Detroit, in the county of Wayne and State of Michigan, have invented certain new and useful Improvements in Speedometer-Driving Mechanism, of which the following is a specification.

This invention relates to mechanism for driving speedometers or the like on motor vehicles.

One object of my invention is to provide a simple speedometer driving mechanism whose moving parts are entirely enclosed and protected from dust and dirt. Another object is to provide such a mechanism that may be readily assembled and disassembled and easily attached and removed from the transmission of the vehicle. Another object is to provide such a mechanism that will be readily adjustable for end play and wear, and having special provision whereby to resist lateral displacement of shaft and gear. Still another object is to provide means whereby all moving parts and the chain or cable leading from the driving mechanism to the speedometer will be amply lubricated without any attention from the operator of the vehicle.

These being among the objects of the present invention, the same consisting of certain features of construction and combination of parts to be hereinafter described and claimed with reference to the accompanying drawings, which illustrate a suitable embodiment of my invention, having the above and other objects in view.

Fig. 1 is a fragmentary view of a motor vehicle transmission showing my device in combination with the same.

Fig. 2 is another fragmentary view of the transmission of Fig. 1, taken on the line A—A of Fig. 1.

Fig. 3 is a view of the adjusting and steadying screw, and

Fig. 4 is a view of the gear member to which the chain or cable which drives the speedometer is attached.

1 is a transmission case; 2 is a transmission cover; 3 is a splined shaft upon which the gear 4 is slidable axially, being moved by the forked member 5 fastened to the shifter rod 6. The end of the splined shaft 3 turns in a roller bearing consisting of an inner race 7, and an outer race 8, and the rollers 9. On the rear end of the splined shaft 3 a driving spider 10, of which a fragmentary view is shown, is fastened by the Woodruff key 11 and nut 12. Felt packing 13 prevents dust and dirt from entering the case 1 and prevents grease from getting out of the same. A gear 14 is fastened to the splined shaft 3, being positioned as shown between the ends of the splines of the splined shaft 3 and the inner race 7 of the roller bearing. A gear member 15 whose axis is at right angles to the axis of the splined shaft 3 is introduced thru the side of the case 1 and is journaled and positioned by the nut member 16 in such a manner that the gear 17 on its end meshes in proper relationship with the gear 14 on the splined shaft 3. The gear member 15 has an opening running thru its center from end to end. The end of the gear member 15 opposite the gear 17 is so formed as to be readily attached to the speedometer drive chain or cable. Thru the opposite side of the case 1 is introduced a screw member 18, its axis being coincident with the axis of the gear member 15. The end of the screw member 18 is reduced to such a size as to be able to journal in the central opening of the gear member 15, for the purpose of steadying the latter laterally. This construction is such as to form intersupporting cantilevers resisting the pressure tending to separate the driving and driven gears 14 and 17 respectively. The reduced portion ends in an abutment 19, which bears against the end of the gear 17 of the gear member 15, limiting and allowing adjustment of the end play of the same. A spiral groove 20 is preferably cut in the reduced end of the screw member 18 in order that lubricant finding its way between the abutment 19 and the end of the gear 17 will be carried along the journaling portion of the member 15, lubricating the same, past the end of the member 18 where some may pass thru the hole 21 and lubricate the bearings between the gear member 15 and the nut member 16, and the remainder passing on thru the gear member 15 and lubricating the speedometer drive chain or cable if thought advisable. The screw member 18 is held in adjusted position by the nut 22. As the drawings show, the collar 23 on the gear member 15 bears against the end of the nut member 16, and the opposite end of the gear member 15 bears against the abutment 19 on the screw member 18. Thus the screw member 15 is positioned axially by these two abutments 19 and 23, any end motion being taken up by the screw member 18. The gear end 17 of the gear member 15 is of smaller diameter than the portion of the nut member 16 threaded into the case 1, in order that the gear member 15 may be removed from or inserted in the case by removing or inserting the nut member 16.

Formal changes may be made in the specific embodiment of the invention described without departing from the spirit or substance of the broad invention, the scope of which is commensurate with the appended claims.

What I claim is:—

1. In combination with a speedometer driving mechanism, a driving member, a driven member having both internal and external journal surfaces, bearings for said surfaces and means on the bearing for said internal journal to limit the axial movement of said driven member.

2. A speedometer drive mechanism comprising a driving member, a driven member having an external journal and an internal journal, an adjustable bearing for said external journal, an adjustable bearing for said internal journal, and means on said driven member and said internal journal bearing for limiting the axial movement of said driven member.

3. A speedometer drive mechanism comprising a driving member, a driven member having a collar formed thereon and provided with external and internal journals, an adjustable bearing for said internal journal, and an adjustable bearing for said external journal cooperating with the collar on said driven member to adjust the same axially.

4. In combination with the transmission of an automobile, a speedometer drive gear driven from the transmission shaft, said drive gear having internal and external journal surfaces, a bearing member mounted on one wall of the transmission case cooperating with said external journal surface, a second bearing member introduced thru the opposite wall of said case cooperating with said internal journal surface, and means for limiting axial movement of said drive gear.

5. In an automobile transmission in combination with the driving mechanism for a speed indicating device, a driving gear, a driven gear member having internal and external journal surfaces, bearings for said journal surfaces, and means for oiling said surfaces and mechanism exterior to the transmission case.

6. In combination with the transmission of an automobile, a bearing member supported by a side of the transmission case, a gear member having internal and external journal surfaces journaled therein, the gear of which meshes with a suitable gear within said transmission case, a laterally extending member introduced thru the side of said transmission case opposite said bearing member and adjustably mounted therein, a portion of said steadying member forming a bearing for the internal journal of said gear member, and means for adjusting said gear member axially in said transmission case.

7. A speedometer drive mechanism comprising a driving member, a driven member having internal and external journals, adjustable bearings for said journals, and means to adjust said driven member axially relative to said driving member.

8. In an automobile change speed mechanism in combination with a speedometer drive mechanism, a driving member on a transmission shaft, a driven member cooperating with said driving member, said driven member having internal and external overlapping journal surfaces; axially adjustable bearings for said journal surfaces; and means for lubricating said bearings and mechanism outside of the transmission case.

9. In combination with an enclosed speedometer driving mechanism, a driving gear, an adjustable driven gear member having adjacent internal and external journal surfaces, bearing members for said surfaces, the line of pressure tending to separate said gear members passing thru one of said journal surfaces, cooperating members forming intersupporting cantilevers for the positioning and supporting of said driven gear member, means for oiling said members and mechanism exterior to said enclosure, and a closable aperture in said enclosure capable of permitting said driven member to be introduced therethru.

10. In combination with a transmission having a main drive shaft with a gear mounted thereon and a housing for said transmission, of an internally and externally journaled member having a gear mounted thereon meshing with said first-named gear for driving indicating mechanism exterior of said housing, said member being retractable through an opening in said housing, an external bearing for said member forming a closure for said opening, and an internal bearing member introduced through said casing on the side opposite said external bearing forming a closure for the opening in said housing opposite said external bearing and retractable in a direction opposite to said first-named member.

Signed by me at Detroit, Michigan, U. S. A., this 27th day of April 1922.

GUY P. HENRY.

Witnesses:
R. E. SCRATCH,
HODGSON S. PIERCE.

Certificate of Correction.

It is hereby certified that in Letters Patent No. 1,540,395, granted June 2, 1925, upon the application of Guy P. Henry, of Detroit, Michigan, for an improvement in " Speedometer-Driving Mechanism," an error appears in the printed specification requiring correction as follows: Page 2, line 86, claim 6, for the word " steadying " read *extending;* and that the said Letters Patent should be read with this correction therein that the same may conform to the record of the case in the Patent Office.

Signed and sealed this 7th day of July, A. D. 1925.

[SEAL.]                                                 WM. A. KINNAN,
*Acting Commissioner of Patents.*